Figure 1:
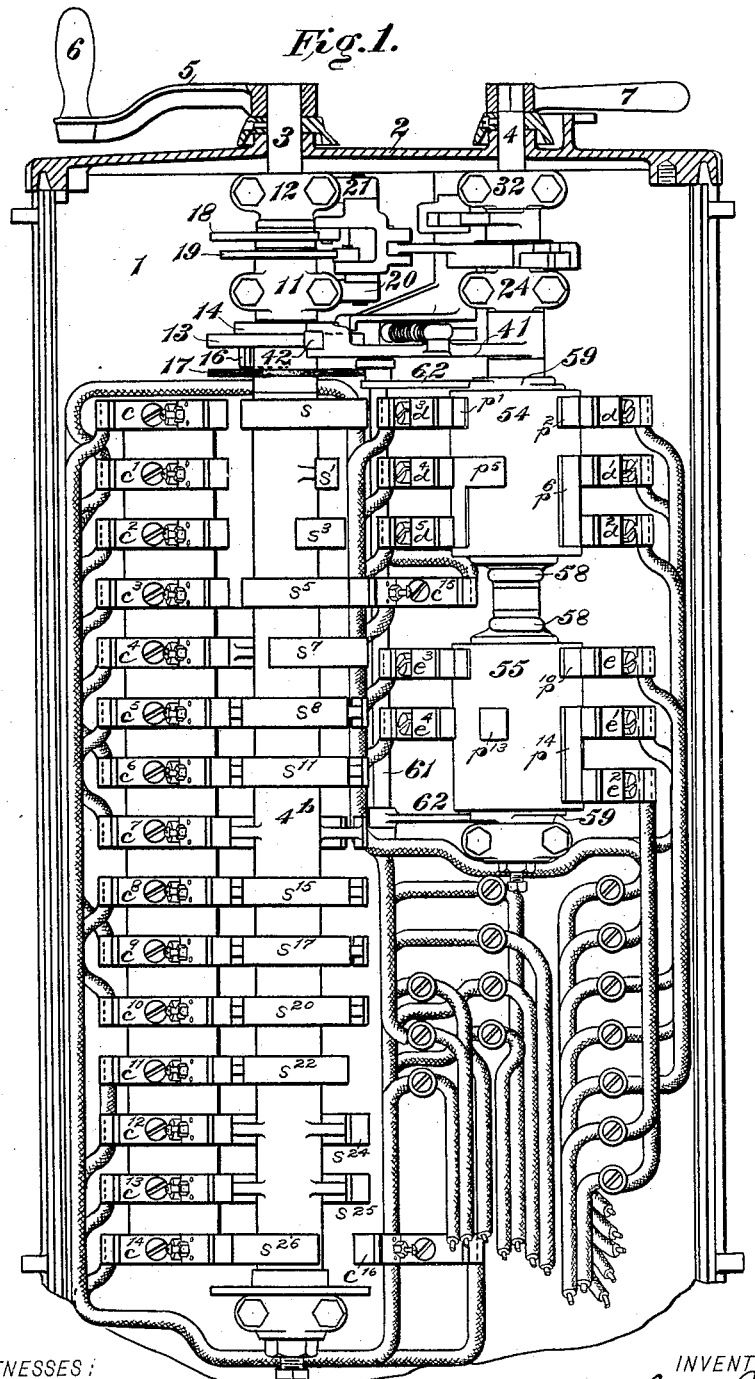

No. 611,465. Patented Sept. 27, 1898.
H. P. DAVIS.
CONTROLLER FOR ELECTRIC MOTORS.
(Application filed Apr. 19, 1898.)

(No Model.) 5 Sheets—Sheet 1.

WITNESSES:
Ethan D. Dodds
Hubert C. Tener

INVENTOR
Harry P. Davis
BY
Wesley G. Carr
ATTORNEY.

No. 611,465. Patented Sept. 27, 1898.
H. P. DAVIS.
CONTROLLER FOR ELECTRIC MOTORS.
(Application filed Apr. 19, 1898.)
(No Model.) 5 Sheets—Sheet 2.
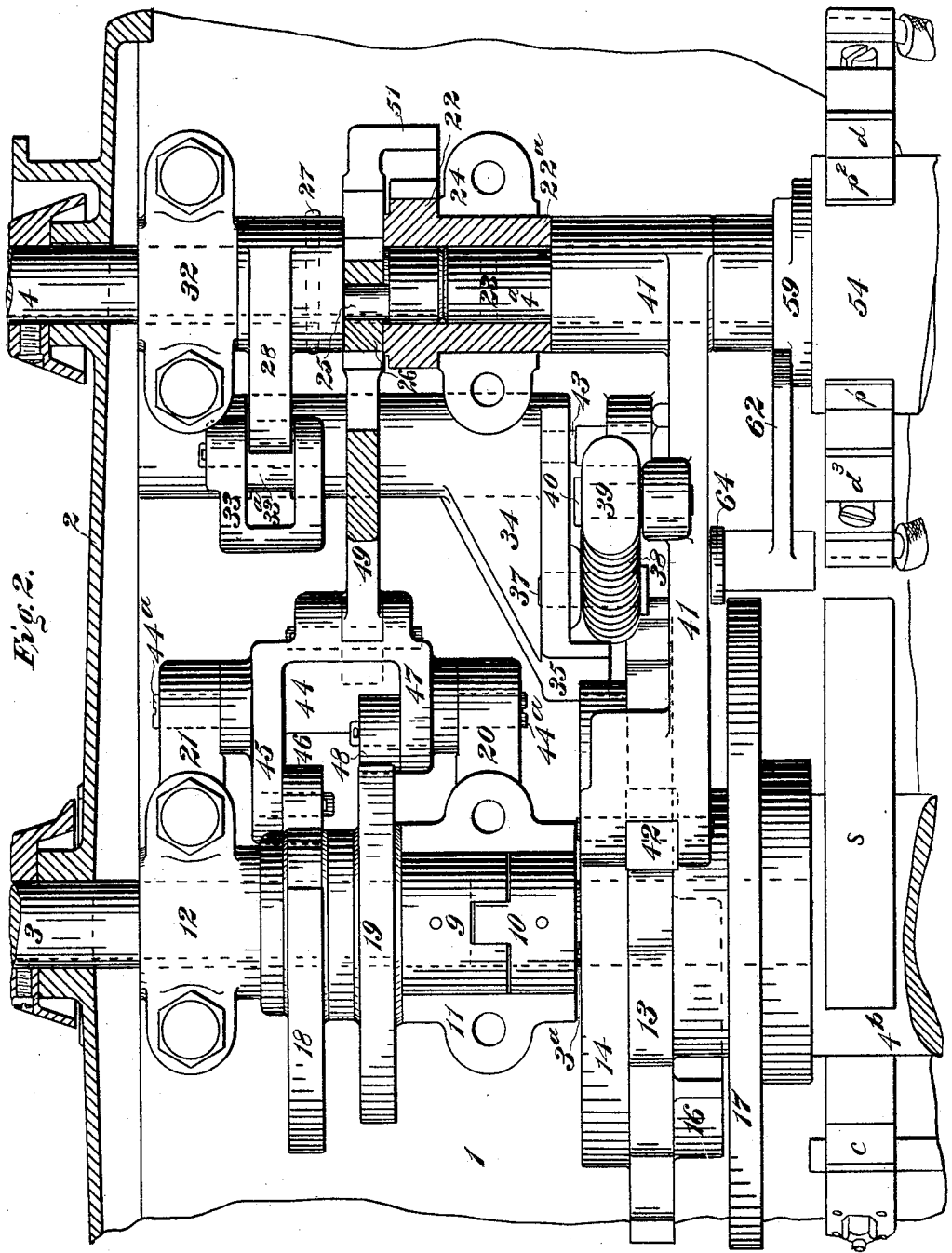
WITNESSES:
INVENTOR
Harry P. Davis
BY
ATTORNEY.

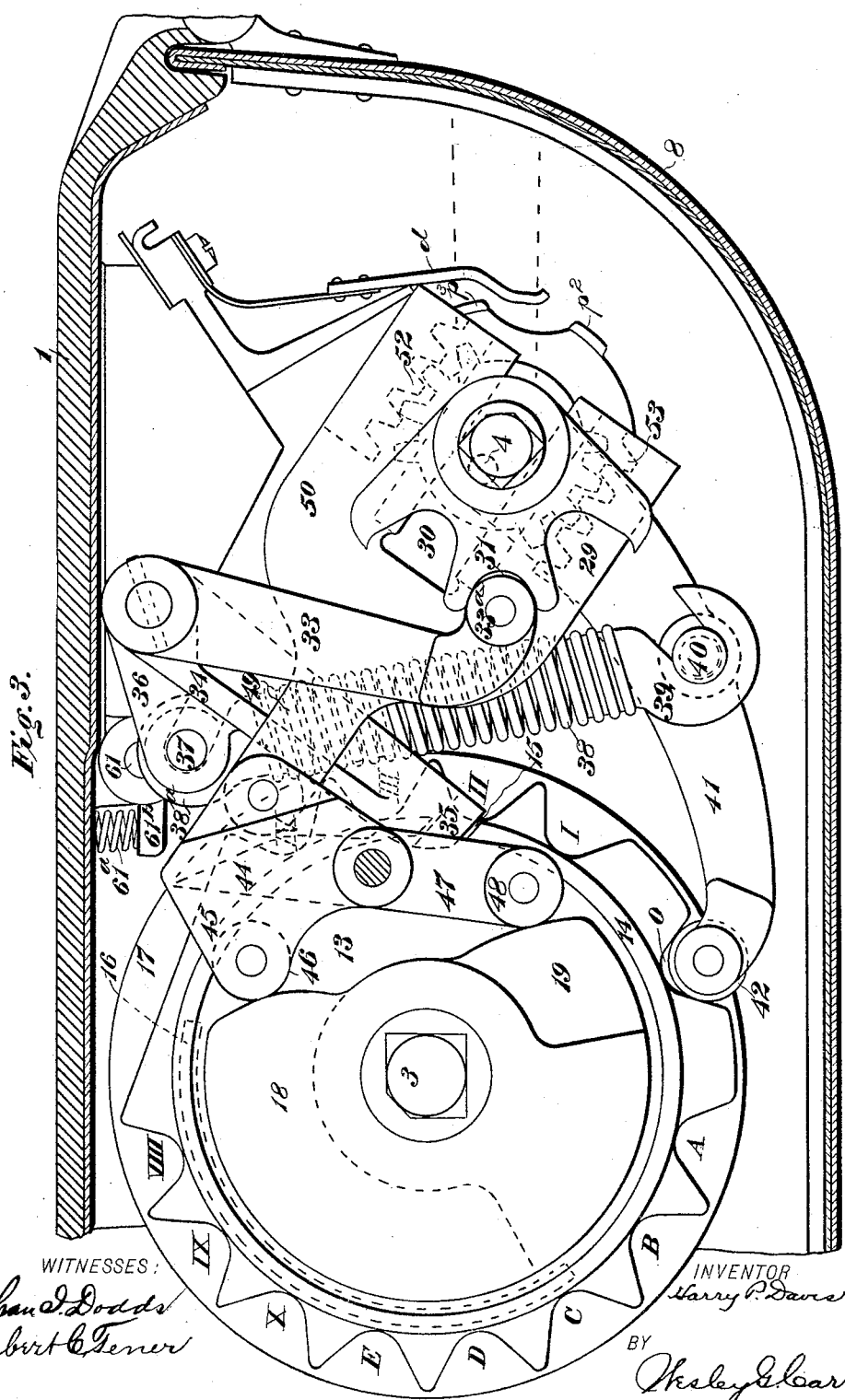

No. 611,465. Patented Sept. 27, 1898.
H. P. DAVIS.
CONTROLLER FOR ELECTRIC MOTORS.
(Application filed Apr. 19, 1898.)
(No Model.) 5 Sheets—Sheet 4.
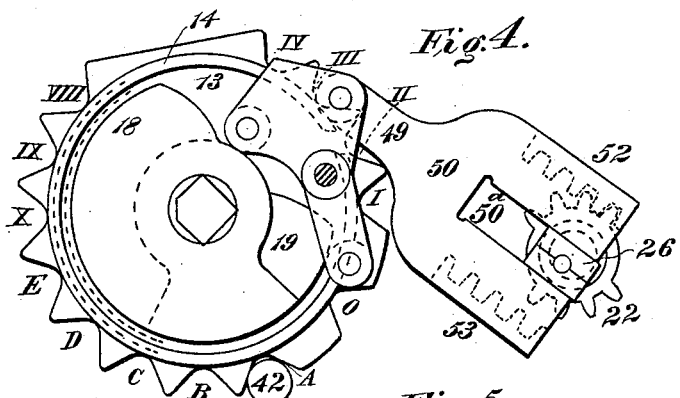
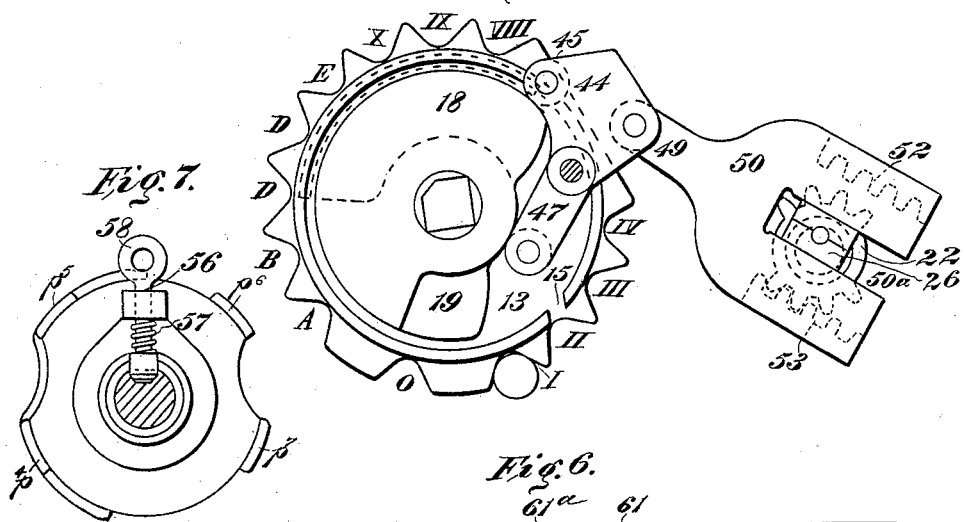
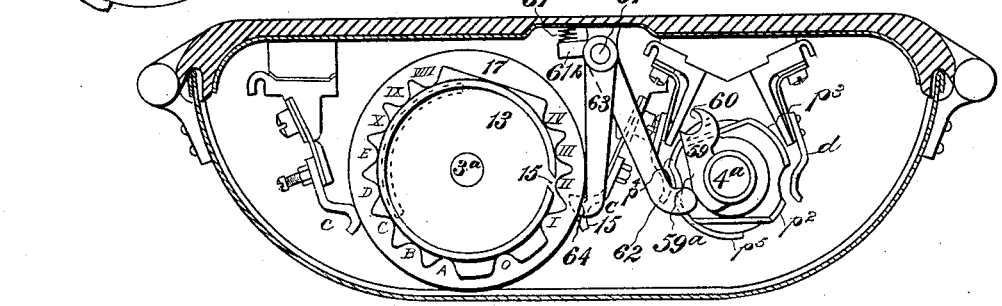
WITNESSES: INVENTOR
Harry P. Davis
BY
ATTORNEY.

No. 611,465. Patented Sept. 27, 1898.
H. P. DAVIS.
CONTROLLER FOR ELECTRIC MOTORS.
(Application filed Apr. 19, 1898.)
(No Model.) 5 Sheets—Sheet 5.
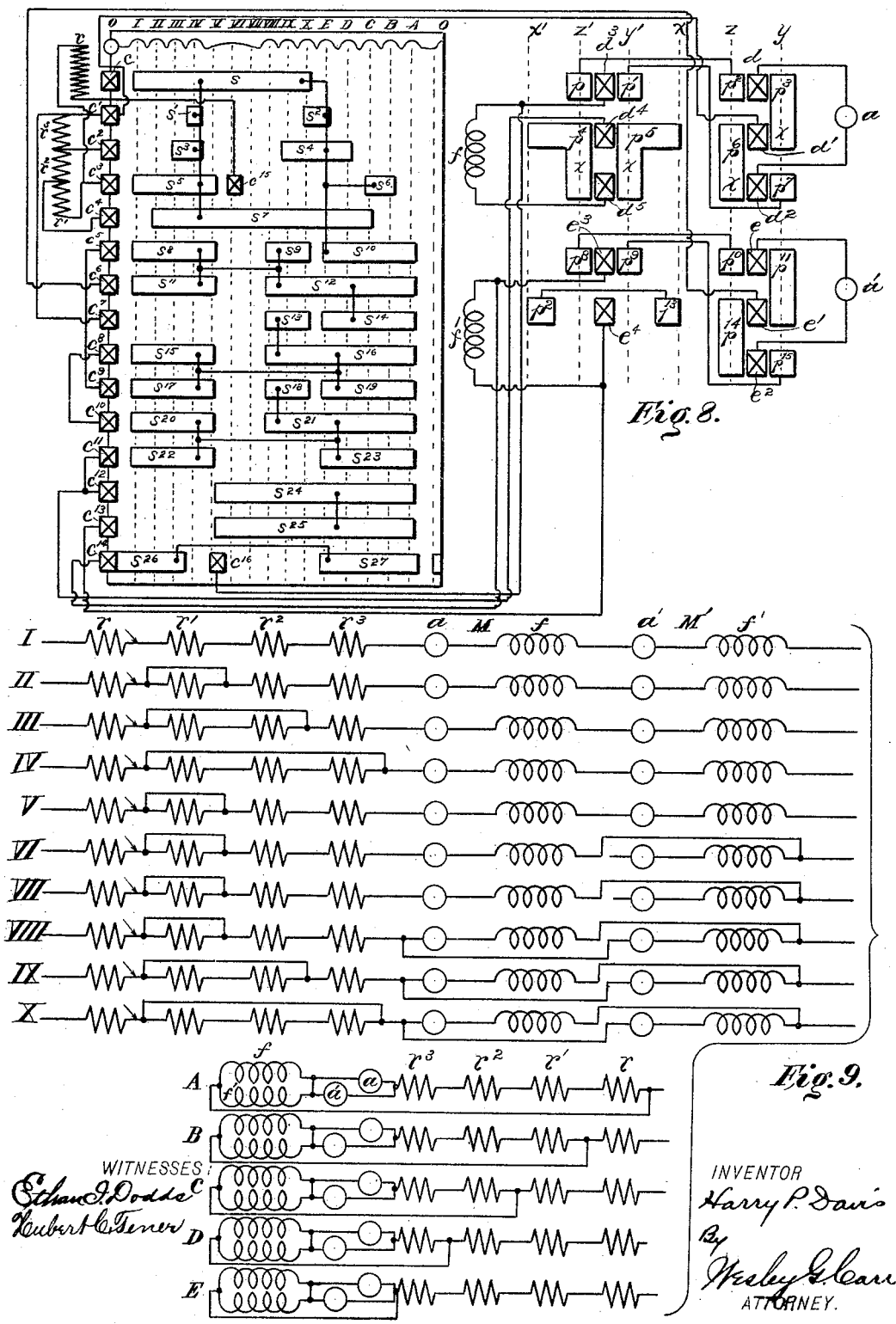

UNITED STATES PATENT OFFICE.

HARRY P. DAVIS, OF PITTSBURG, PENNSYLVANIA, ASSIGNOR TO THE WESTINGHOUSE ELECTRIC AND MANUFACTURING COMPANY, OF PENNSYLVANIA.

CONTROLLER FOR ELECTRIC MOTORS.

SPECIFICATION forming part of Letters Patent No. 611,465, dated September 27, 1898.

Application filed April 19, 1898. Serial No. 678,195. (No model.)

*To all whom it may concern:*

Be it known that I, HARRY P. DAVIS, a citizen of the United States, residing in Pittsburg, in the county of Allegheny and State of Pennsylvania, have invented a new and useful Improvement in Controllers for Electric Motors, (Case No. 774,) of which the following is a specification.

My invention relates to controllers for electric motors, and particularly to that class of controllers that embody means for controlling the power and speed of motors employed for propelling railway-vehicles, and also means for so arranging and regulating the circuits of the motors that they may act as generators, and thus produce a braking effect such as is necessary to reduce the speed of and bring to rest the vehicle which is normally propelled by them when acting as motors.

The object of my invention is to provide a controller of the character above specified with two switches, one of which is operated to vary the resistance in the circuit of the motors and to change the connection of the motors from series to parallel, and vice versa, when supplied with propelling-current from an exterior source, and also to connect them in parallel in a closed local circuit and to vary the resistance in such local circuit when they are so connected, whereby the braking effect incident to their operation as generators may be secured and such braking effect varied by varying the resistance, and with means which may be so adjusted independently of both switches that the normal operation of the main switch will effect the operation of the other switch to reverse the motors as the main switch moves from the first power position to the first braking position, and vice versa.

A further object of the invention is to provide a two-part reversing-switch and means whereby either part of the reversing-switch may be disconnected from the other part and moved to such position as to cut the corresponding motor out of circuit and prevent the movement of the main controller-drum beyond the positions corresponding to a series connection of the motors.

It has been proposed prior to my invention to utilize the propelling-motors of a vehicle as generators and to utilize the braking effect due to such operation in reducing the speed of the vehicle and bringing the same to rest. The necessary changes in the circuit connections of the motors have usually been effected, however, by means of two switches rigidly connected together. With such an arrangement a third switch, independently operated, was necessary for reversing the connections of the motors when it was desired to change the direction of movement of the propelled vehicle. It has also been proposed prior to my invention to effect a reversal of the motor-circuits—as the change from power connection to brake connection of the motors is made, and vice versa—by means of a separate switch and mechanism intermediate the same and the main switch. In such prior construction the movable member of the reversing-switch was primarily adjusted to one or the other of two positions, according to the direction of movement desired for the car, and was always moved in the same direction with reference to the main switch when operated in conjunction therewith. Prior to my invention independent switches have also been employed for cutting the motors out of circuit in all cases, so far as I am aware. I propose by my invention to employ in the controller only two switches normally operated by a single handle, one being the controller proper and the other a combined cut-out and reversing switch, and to provide operating connections between the two so constructed and arranged that the reversing-switch will be actuated in one direction when the controller proper is moved to the first braking position and in the opposite direction when the controller proper is moved from the first braking position to the first power position. I provide also a means that operates independently of the reversing-switch to so adjust the actuating mechanism as to effect a partial movement of rotation of the reversing-switch drum corresponding in direction to that of the main drum to secure movement of the car in one direction and a partial rotation in the opposite direction to secure a reverse movement of the car.

In the accompanying drawings I have illustrated means for practicing my invention, Figure 1 being a front elevation of the controller, the top portion of the cover being in section, the side cover being removed, and the lower portion of the frame being broken away. Fig. 2 is a front elevation, on an enlarged scale, of the upper portion of the controller and the operating mechanism. Fig. 3 is a plan view of most of the mechanism shown in Fig. 2, the frame and cover of the controller being shown in section and one side being broken away. Fig. 4 is a plan view of mechanism for operating the reversing-switch, shown in one of its extreme positions—that is, in the first braking position. Fig. 5 is a view similar to Fig. 4, showing the controller in the first power position, the reversing-switch being set so that the circuits of the motors are reversed with reference to the position shown in Fig. 4. Fig. 6 is a view, partially in plan and partially in section, of the controller, showing details of the cut-out switch. Fig. 7 is a detail view of a feature of the cut-out device. Fig. 8 is a diagram of the controller and the motors and resistances in circuit therewith, the surface of the main controller-drum and that of each of the reversing-switch drums being shown as developed into a plane. Fig. 9 is a diagram showing the circuits of the motors and resistances corresponding to the various power and brake positions of the controller.

Referring now particularly to Figs. 1 to 7, inclusive, 1 is the base or back portion of the frame, which is ordinarily fastened to the dashboard of the vehicle, and 2 is a cover through which projects a shaft 3, that is coupled to and constitutes an extension of the main-controller-drum shaft $3^a$, and a shaft 4, that is in alinement with the reversing-switch shaft $4^a$, but rotates independently thereof. The shaft 3 is provided with the usual operating-arm 5 and handle 6 and the shaft 4 with a handle 7. The front sheet-metal cover 8 may be of the usual construction and may be hinged or otherwise fastened to the back or base portion 1. The main controller-drum $4^b$ is provided with contact-pieces $s$ to $s^{27}$, properly arranged to coöperate with stationary contact-fingers $c$ to $c^{16}$, as is usual in devices of this character, so as to secure the desired changes in the circuit connections and variations in resistance. The structure of these contact-pieces and contact-fingers is not claimed by me as new, and the arrangement of the same will be more conveniently described hereinafter in connection with Figs. 8 and 9 of the drawings, which show the circuits and circuit connections.

The abutting ends of shafts 3 and $3^a$ are fastened together by means of a coupling 9 10, so as to permit ready removal of the drum when desired. The coupling 9 10 rotates in a bearing 11 and the upper portion of shaft 3 in a bearing 12. Below this coupling 9 10 and bearing 11 the usual notched indicating-plate 13 is located, this plate being keyed to the shaft $3^a$ or otherwise rigidly fastened thereon and provided on its upper side with an annular rib 14, the latter being cut away on one side to form a notch 15, the purpose of which will hereinafter appear. The notched plate 13 is provided on its under side with a rib 16, which extends through a portion of a circumference only. Below the rib 16 and between that and the drum proper is a disk 17 of insulating material.

On the shaft 3 and between the bearings 11 and 12 are rigidly fastened two cam-plates 18 and 19. Projecting from the bearing 11 is an extension 20, and projecting from the bearing 12 in vertical alinement with the extension 20 is a similar extension 21.

The upper end of the shaft $4^a$ is provided with a pinion 22, the pinion proper being located just above the end of the shaft and being provided with an integral extension in the form of a sleeve $22^a$, which is fastened to the shaft by means of a pin 23 and is supported in a bearing 24. The lower end of the shaft 4 rests upon the top of the shaft $4^a$, the hollow pinion constituting a lateral bearing therefor. Just above the pinion 22 the shaft 4 is turned down to form a relatively small crank-pin 25, which is surrounded by a rectangular block 26, having a sufficiently loose fit thereon so that the pin may easily turn in the block. Fastened to the shaft 4 just above the crank-pin 25 and block 26, by means of a pin 27 or otherwise, is a head 28, provided with projecting arms so constructed and arranged as to form two deep notches 29 and 30 and an intermediate shallow notch 31. Just above the head 28 a bearing 32 for shaft 4 is provided. An arm 33 is pivotally mounted at its inner end near the back plate of the controller, and is provided with a roller $33^a$ at its outer end, which is in position to engage at all times with one or another of the notches 29, 30, and 31. Rigidly connected with the arm 33 is an arm 34, which is provided at its outer end with a lateral projection 35 of such form and dimensions as to enter the recess 15 in the annular rib 14 when the roller $33^a$ is in the middle notch 31 of the head 28. A third arm 36, which is or may be a part of arm 34, is provided at its outer end with a pin 37, with which engages a hook $38^a$ on one end of a coiled spring 38. The other end of the coiled spring 38 is also provided with a hook 39, that engages with a pin 40 on a holding pawl or lever 41, one end of this holding pawl or lever 41 being sleeved or journaled upon the reversing-switch-drum shaft $4^a$ and the other end being provided with a roller 42, which engages with the notches in the edge of the plate 13.

The arms 33, 34, and 36 preferably constitute parts of a single piece or casting journaled at top and bottom upon suitable pins or studs, one of which is shown at 43 in Fig. 2.

Journaled in the extension-brackets 20 and 21, by means of pintles $44^a$, is a head 44, having an upper arm or extension 45, in which is journaled a roller 46, this roller being in the plane of the cam-plate 18 on the shaft 3. The head 44 is also provided with a lower arm 47, the outer end of which is provided with a roller 48 in the plane of the cam-plate 19, so as to engage with its cam-surface. Pivoted to the outer side of the head 44 is one end of an arm 49. This arm 49 is broadened to form a head 50, having at its outer sides near its outer end downwardly-projecting flanges 51, one of these flanges being provided with a rack 52 and the other with a similar rack 53, these racks being constructed and arranged to mesh with the teeth of the pinion 22, but being spaced apart such a distance that when the pinion is in full engagement with one of the racks it is out of engagement with the other. The main or upper portion of the head 50 is provided with a long slot $50^a$ to receive the rectangular block 26, so that as the handle 7 is moved from one position to another the crank-pin 25 will move the block 26 and thus shift the racks 52 and 53 so as to bring the one or the other into engagement with the teeth of the pinion 22. This block 26 also serves as a guide for the arm 49 and head 50 as the same are reciprocated by the action of the cam-plates 18 and 19 against the head or block 44.

The reversing-switch comprises two drums 54 and 55, which are respectively provided with the necessary contact-strips $p$ to $p^7$ and $p^8$ to $p^{15}$ to coöperate with stationary contact-fingers $d$ to $d^5$ and $e$ to $e^4$ as the drums are rotated to effect a reversal of the armature-circuits of the motors. Each of the drums 54 and 55 is sleeved upon the shaft $4^a$, and each is normally locked to the shaft by means of a pin 56, which enters a suitable recess in the shaft and is held therein by means of a spring 57, the outer end of the pin being provided with a ring 58 or other device, which may be readily grasped by the hand to withdraw the pin from its socket in the shaft when it is desired to unlock the drum.

Rigidly fastened to the upper end of the drum 54 is a plate 59, having a peripheral cam-surface $59^a$ at one side and a notch or socket 60 at the end of the cam-surface. The lower end of the drum 55 is provided with a plate 59, that is a duplicate of the one at the top of the drum 54.

Journaled in the frame 1 between the main drum and reversing-drums is a long rod 61, to which are rigidly fastened two arms 62. These arms are respectively in the planes of the upper and lower plates 59 and are held in engagement therewith by means of a spring $61^a$ and a lug $61^b$ on shaft 61, against which the spring $61^a$ bears. A third arm 63 is rigidly fastened at one end to the shaft or rod 61, the outer end of said arm being provided with a hook 64 in the plane of the rib 16, this construction being such that when it is desired to cut either motor out of circuit the pin 56 of the corresponding drum is withdrawn from its socket in the shaft $4^a$, and the drum is turned to the right until the outer end of the arm 62, corresponding to the plate 59 of that drum, drops into the socket 60. By reason of the cam-surface $59^a$ of this plate and the distance of the socket 60 from the axis on which the drum turns the arm 63 will be moved inward toward the main controller-drum a sufficient distance to bring the hook 64 in the path of movement of the segmental rib 16, and thus prevent the movement of the main drum beyond the last running position corresponding to the connection of the motors in series when both motors are in circuit.

Referring now to Figs. 8 and 9 of the drawings, M and M' are the motors, $f f'$ being the field-magnets and $a\ a'$ the armatures. $r$, $r'$, $r^2$, and $r^3$ are the resistances and $c$, $c'$, $c^2$, $c^3$, $c^4$, $c^5$, $c^6$, $c^7$, $c^8$, $c^9$, $c^{10}$, $c^{11}$, $c^{12}$, $c^{13}$, and $c^{14}$ the contact-fingers on one side of the main drum and $c^{15}\ c^{16}$ the contact-fingers on the other side of said drum. $s$ is the contact-strip on the drum $4^b$ corresponding to finger $c$; $s'$ and $s^2$, the strips corresponding to finger $c'$; $s^3$ and $s^4$, the strips corresponding to finger $c^2$; $s^5$ and $s^6$, the strips corresponding to fingers $c^3$ and $c^{15}$; $s^7$, the strip corresponding to finger $c^4$; $s^8$, $s^9$, and $s^{10}$, the strips corresponding to finger $c^5$; $s^{11}$ and $s^{12}$, the strips corresponding to finger $c^6$; $s^{13}$ and $s^{14}$, the strips corresponding to finger $c^7$; $s^{15}$ and $s^{16}$, the strips corresponding to $c^8$; $s^{17}$, $s^{18}$, and $s^{19}$, the strips corresponding to $c^9$; $s^{20}$ and $s^{21}$, the strips corresponding to finger $c^{10}$; $s^{22}$ and $s^{23}$, the strips corresponding to finger $c^{11}$; $s^{24}$, the strip corresponding to finger $c^{12}$; $s^{25}$, the strip corresponding to finger $c^{14}$, and $s^{26}$ and $s^{27}$ the strips corresponding to fingers $c^{14}$ and $c^{16}$. The several operating power positions of the controller-drum and the notches in the notched plate 13 corresponding thereto are designated by the numbers I, II, III, IV, V, VI, VII, VIII, IX, and X and the "off" position by 0. The several braking positions and the corresponding notches in the plate 13 are designated as A, B, C, D, and E. In Fig. 8 these various notches in the plate 13 are indicated as in vertical alinement with the corresponding spaces or positions on the drum. For convenience of location of the holding-pawl 41 these notches are not actually so located with reference to the contact-strips on the drum; but the operation is the same as it would be if they were located as indicated in Fig. 8.

It will be seen from the illustration in Figs. 8 and 9 that in position I the motors are in series and that the portions $r'$, $r^2$, and $r^3$ of the resistance are in circuit. In position II portion $r'$ of the resistance is cut out, leaving the portions $r^2$ and $r^3$ of the resistance in circuit and the motors in series. In position III portions $r'$ and $r^2$ of the resistance are cut out, leaving portion $r^3$ in circuit and the motors in series. In position IV all of the resistance is cut out, leaving the motors in series. In position V the portions $r^2$ and $r^3$ of the resistance are again cut in and the motors are in series. In position VI the same amount of resistance as in position V is included in circuit and motor M' is cut out. In position VII the conditions are the same as in position VI. In position VIII the same amount of resistance is in circuit as in position VII and the motors are in parallel. In position IX portions $r'$ and $r^2$ of the resistance are cut out, leaving the motors in parallel, and in position X all of the resistance is cut out and the motors are in parallel, this being the last running-power position. During the changes corresponding to positions I to X of the main drum the contact-fingers $d$, $d'$, $d^2$, $e$, $e'$, and $e^2$ of the reversing-switch are in position $y$ and the fingers $d^3$, $d^4$, $d^5$, $e^3$, and $e^4$ are in position $y'$, or the first-named set of fingers are in position $z$ and the second-named set in position $z'$. As the main drum passes to position A the sets of reversing-switch fingers pass from positions $y$ and $y'$ to positions $z$ and $z'$, or vice versa, according to which positions they occupied during the power connection of the motors. In position A the motor connections are therefore reversed and the motors are connected in parallel with all of the resistance in circuit, including the additional resistance $r$, that was not used in any of the power positions. In position B the connection is the same with one portion of the resistance cut out, in position C the same with another portion of the resistance cut out, in position D the same with a still further section of resistance cut out, and in position E the same circuit connections with all resistance cut out.

Referring now to the figures of the drawings illustrating the mechanism of the controller in connection with Figs. 8 and 9, in each of Figs. 1, 2, 3, and 6 the main controller-drum is shown in the zero or "off" position and the handle 7 is in its intermediate position, so that the roller $33^a$ on the arm 33 is in the middle notch 31 of the head 28. By reason of this position of the parts the end 35 of the arm 34 is located in the slot 15 in the annular rib 14, thus preventing any movement of the controller-drum in either direction. In order to operate the controller, the handle 7 is moved either from left to right to bring the roller $33^a$ into notch 30 or from right to left to bring such roller into notch 29, depending upon the direction in which it is desired to move the vehicle. In whichever direction the handle is moved the notch receiving the roller $33^a$ is of such depth that the spring 38 will serve to withdraw the end 35 of arm 34 from the recess 15, and thus release the controller-drum. It will also be seen that when the controller-drum is in this "off" or zero position the pinion 22 is midway of the rack with which it is in mesh and that the rollers 46 and 48 are respectively in engagement with those portions of the peripheries of cam-plates 18 and 19 that join the portions of maximum and minimum radii. If the handle 7 is moved from left to right, the crank-pin 25, acting upon the block 26, and the latter upon the head 50, will serve to move the rack 52 into engagement with the pinion 22 and to move the rack 53 completely out of engagement with such pinion. If the controller-drum handle be moved in a clockwise direction to bring the roller 42 on the pawl 41 into notch I, the cams 18 and 19 will be correspondingly moved, so as to bring the roller 46 on arm 45 into engagement with that portion of the periphery of the cam 18 having the greatest radius and to bring the roller 48 on the arm 47 into contact with that portion of the periphery of the cam-plate 19 having the smallest radius. This action of the cam-plates upon the head 44 will move the head 50 and its racks 52 and 53 longitudinally, and thus serve, by means of the engagement of the rack 52 with the pinion 22, to rotate the reversing-switch drums so as to bring the contact-fingers into positions $y$ and $y'$. This position of the cam-plates and the coöperating head 44 and its rollers 46 and 48 is shown in Fig. 5. The illustration of the said figure is, however, different from that just described in that the position of the heads 50 corresponds to the extreme left-hand position of the handle 7 and the head 28, thus insuring the movement of the reversing-switch drum in the opposite direction to that described and therefore insuring the reverse connection of the motors. A continued movement of the controller-handle from right to left until position X is reached—*i. e.*, until the roller 42 rests in notch X—will effect the various changes represented in the first ten positions indicated in Fig. 9 of the drawings, and no movement of the reversing-switch will take place, for the reason that the portions of the cam-plates 18 and 19 having the respective maximum and minimum radii remain in engagement with the rollers 46 and 48 on the arms 45 and 47 of the head 44. The notch X being the last running or operating notch corresponding to a maximum speed of the motors, the handle of the controller will be moved in the opposite direction—*i. e.*, from left to right—to decrease the speed of the motors or to bring them to rest. The position of the reversing-switch and its operating mechanism will obviously remain unchanged until the notch I comes again into engagement with the roller 42. In passing from notch I to notch 0 the parts will be moved into the position shown in Fig. 3, except that rack 52 will be in mesh with the pinion 22. Assuming that it is desired to secure the braking effect incident to operating the motors as generators, the rotation of the drum will be continued from left to right, and when notch A comes into engagement with the roller 42 the action of the cams upon the rollers 46 and 48 in the arms 45 and 47 will have shifted the head 50 and its racks from right to left into the position shown in Fig. 4, thus giving the necessary partial rotation to the reversing-switch drums necessary to bring the contact-fingers into positions $z$ and $z'$. The relation of the motors and resistances is indicated at position A in Fig. 9 of the drawings, this being the position affording the minimum braking effect by reason of the fact that the maximum amount of resistance is included in the circuit. If the rotation of the drum be continued from left to right and from notch to notch until the notch E is reached, the various changes indicated in Fig. 9 will be effected, the final braking position E being that in which the motors are connected in parallel in the local circuit as generators with no external resistance in such circuit. When it is desired to again apply power to the car, the controller-drum will of course be rotated from right to left, and as the roller 42 passes from notch A to notch I the reversing-switch will again be actuated by reason of the cam-plates, the rack 52 and pinion, and the intermediate mechanism. If it is desired to run the vehicle in the opposite direction to that described, it is merely necessary to move the handle 7 to bring the roller 33ᵃ into notch 29, thus moving the rack 53 into full engagement with the pinion 22, as is indicated in Fig. 5, this change being necessarily made when the main drum is in the zero or "off" position, since the rib 14 on the notched plate 13 will prevent any movement of the arms 33 and 34 and the head 28 when the drum is in any other position. If one of the motors becomes disabled or for any other reason it is desired to cut either of the motors out of circuit, the pin 56 of the corresponding drum will be withdrawn from its socket and the drum rotated from left to right, so that the respective sets of fingers will occupy positions $x$ and $x'$, this position of the drum being reached when the notch 60 in the plate 59 is in position to receive the end of arm 62. The rod 61 will be thus turned and will move the hook 64 of the arm 63 into position to be engaged by the end of rib 16 when the roller reaches notch IV in the plate 13, it being obviously unnecessary and undesirable to move the controller-drum through the points corresponding to parallel connection of the motors when there is only one motor in circuit.

I have not undertaken to illustrate and describe in detail the wiring of the controller, although the same is shown in part in Fig. 1, since the invention is not specially concerned with the wiring, and any one skilled in the art could make the necessary connections and arrangements of circuits from the illustrations and description given.

While I have shown and described specific mechanism for operating the controller parts, in order that a full disclosure of means for practicing the invention may be made, I do not regard the invention as limited to any specific details of construction, the only requisite being that the mechanism employed shall be operative and capable of effecting the desired functions.

I claim as my invention—

1. In a combined power and brake controller, the combination with a main drum and coöperating contact-fingers, of a reversing-switch, mechanism intermediate its movable member and the main-drum shaft whereby said member is moved as the main drum moves into the first braking position, and adjusting means for setting said mechanism to throw the movable member of the reversing-switch in either direction as said braking position is reached, said adjusting means being both structurally and operatively independent of the reversing-switch.

2. In a combined power and brake controller, the combination with a main drum and coöperating contact-fingers, of a reversing-switch comprising a drum and coöperating contact-fingers, mechanism intermediate said drums, means moving with the main-drum handle and serving to actuate said intermediate mechanism to turn the reversing-switch drum as the main drum passes to and from the first braking position and then only, and structurally and operatively independent means for setting the intermediate mechanism so as to effect the movement of the reversing-switch drum in either direction.

3. In a controller for electric motors, the combination with the main controlling-drum and coöperating contact-fingers, comprising means for varying the circuit connections of the motors and the resistance in said circuits, and means for connecting the motors in parallel in a closed local circuit having equalizing connections and for varying the resistance in said local circuit, of a switch for reversing the motors, and actuating mechanism therefor operated in one direction by the normal movement of the main controller-handle simultaneously with the making of the local circuit and in the other direction simultaneously with the breaking of said circuit, a guide for said actuating mechanism and means for adjusting said guide laterally to insure a reversal of the movements of the reversing-switch with reference to those of the main drum.

4. A reversing-switch for two electric motors comprising two movable members, an actuating device therefor, means for locking either or both of said members to said actuating device and for detaching the same therefrom at will and stationary contacts coöperating with said movable members.

5. In a controller for two electric motors, a combined reversing and cut-out switch comprising two rotatable members, an actuating-shaft therefor, means for connecting either or both of said members to said shaft and for disconnecting the same at will, stationary reversing-contacts, and stationary cut-out contacts coöperating with said rotatable members.

6. In a series-parallel controller for railway-motors, a rotatable contact-drum and coöperating stationary contacts, in combination with a reversing and cut-out switch comprising two drums, an actuating-shaft therefor, means for connecting each of said drums to and disconnecting it from said shaft, stationary contacts coöperating with said drums and a device actuated by said disconnecting means to prevent the rotation of the controller-drum beyond the series contacts.

7. A reversing and cut-out switch for either or both of two electric motors comprising stationary contacts, a shaft, two contact-bearing drums journaled upon said shaft and normally locked thereto and means for unlocking either of said drums and moving it to the cut-out position independently of the other.

8. In a controller for electric motors, the combination with a contact-bearing drum and coöperating stationary contacts, of a pair of reversing and cut-out drums and coöperating stationary contacts, an actuating-shaft to which either or both of said drums may be locked and means for locking the controller-drum against rotation when the said actuating-shaft is in an intermediate position.

In testimony whereof I have hereunto subscribed my name this 11th day of April, 1898.

HARRY P. DAVIS.

Witnesses:
WESLEY G. CARR,
HUBERT C. TENER.